US011540122B2

(12) United States Patent
Moisanen et al.

(10) Patent No.: US 11,540,122 B2
(45) Date of Patent: Dec. 27, 2022

(54) APPARATUSES AND METHODS FOR PROTECTING AN INITIAL NON-ACCESS STRATUM (NAS) MESSAGE AFTER A PUBLIC LAND MOBILE NETWORK (PLMN) CHANGE

(71) Applicant: MediaTek Singapore Pte. Ltd., Singapore (SG)

(72) Inventors: Matti Moisanen, Oulu (FI); Marko Niemi, Oulu (FI)

(73) Assignee: MEDIATEK SINGAPORE PTE. LTD., Solaris (SG)

( * ) Notice: Subject to any disclaimer, the term of this patent is extended or adjusted under 35 U.S.C. 154(b) by 277 days.

(21) Appl. No.: 16/699,261

(22) Filed: Nov. 29, 2019

(65) Prior Publication Data

US 2020/0186996 A1 Jun. 11, 2020

Related U.S. Application Data

(60) Provisional application No. 62/777,862, filed on Dec. 11, 2018.

(51) Int. Cl.
| | |
|---|---|
| *H04L 9/06* | (2006.01) |
| *H04W 12/037* | (2021.01) |
| *H04W 60/00* | (2009.01) |
| *H04L 9/40* | (2022.01) |

(52) U.S. Cl.
CPC ......... *H04W 12/037* (2021.01); *H04L 9/0618* (2013.01); *H04L 63/20* (2013.01); *H04W 60/00* (2013.01)

(58) Field of Classification Search
CPC .............................. H04L 63/20; H04L 9/0618

USPC .......................................................... 380/270
See application file for complete search history.

(56) References Cited

U.S. PATENT DOCUMENTS

| | | | |
|---|---|---|---|
| 2014/0198637 A1* | 7/2014 | Shan ....................... | H04L 47/12 370/229 |
| 2015/0126189 A1 | 5/2015 | Rao et al. | |
| 2017/0013546 A1* | 1/2017 | Mackenzie ........... | H04W 48/16 |
| 2017/0353851 A1 | 12/2017 | Gonzalez et al. | |

FOREIGN PATENT DOCUMENTS

WO 2017/177940 A1 10/2017

OTHER PUBLICATIONS

"3GPP TSG-CT WG1 Meeting #119;" Aug. 2019; pp. 1-3.
"3GPP TSG-SA WG3 Meeting #95-Bis;" Jun. 2019; pp. 1-4.

(Continued)

*Primary Examiner* — Anthony D Brown
(74) *Attorney, Agent, or Firm* — McClure, Qualey & Rodack, LLP

(57) ABSTRACT

A User Equipment (UE) including a wireless transceiver and a controller is provided. The wireless transceiver performs wireless transmission and reception. The controller selects a PLMN via the wireless transceiver, and determines whether a predetermined ciphering algorithm is adopted for a Non-Access Stratum (NAS) security context. In response to selecting the PLMN and the predetermined ciphering algorithm being adopted for the NAS security context, the controller sends an initial NAS message in which Information Elements (IEs) are in cleartext only to the selected PLMN via the wireless transceiver.

18 Claims, 4 Drawing Sheets

(56) References Cited

OTHER PUBLICATIONS

"3GPP TSG-CT WG1 Meeting #121;" Nov. 2019; pp. 1-3.
"3rd Generation Partnership Project; Technical Specification Group Services and System Aspects; Security architecture and procedures for 5G system (Release 15);" Sep. 2018; pp. 1-175.
"3rd Generation Partnership Project; Technical Specification Group Services and System Aspects; 3GPP System Architecture Evolution (SAE); Security architecture (Release 15);" Sep. 2018; pp. 1-163.
Extended European Search Report dated Jan. 5, 2022, issued in application No. EP 19896053.6.
"5G; Non-Access-Stratum(NAS) ProtocolFor 5G System (5GS); Stage 3 (3GPP TS 24.501 Version 15.1.0 Release 15);" ETSI TS 124 501 V15.1.0 (Oct. 2018), 3GPP TS 24.501 version 15.1.0 Release 15; Oct. 2018; pp. 1-406.
Qualcomm Incorporated, Ericsson; "Support for Partial Ciphering of Initial NAS Messages;" SA WG2 Meeting #S2-129bis, S2-1813058; Nov. 2018; pp. 1-25.

\* cited by examiner ant message including only a limited set of Information Elements (IEs) in cleartext after a PLMN change if a predetermined ciphering algorithm (e.g., a null ciphering algorithm or a weak confidentiality algorithm) is adopted for a NAS security context.

APPARATUSES AND METHODS FOR PROTECTING AN INITIAL NON-ACCESS STRATUM (NAS) MESSAGE AFTER A PUBLIC LAND MOBILE NETWORK (PLMN) CHANGE

CROSS REFERENCE TO RELATED APPLICATIONS

This Application claims priority of U.S. Provisional Application No. 62/777,862, filed on Dec. 11, 2018, the entirety of which is incorporated by reference herein.

BACKGROUND OF THE APPLICATION

Field of the Application

The application generally relates to Non-Access Stratum (NAS) security mechanisms, and more particularly, to apparatuses and methods for protecting an initial Non-Access Stratum (NAS) message after a Public Land Mobile Network (PLMN) change.

Description of the Related Art

In a typical mobile communication environment, a User Equipment (UE) (also called a Mobile Station (MS)), such as a mobile telephone (also known as a cellular or cell phone), or a tablet Personal Computer (PC) with wireless communications capability, may communicate voice and/or data signals with one or more service networks. The wireless communications between the UE and the service networks may be performed using various cellular technologies, which include the Global System for Mobile communications (GSM) technology, the General Packet Radio Service (GPRS) technology, the Enhanced Data rates for Global Evolution (EDGE) technology, the Wideband Code Division Multiple Access (WCDMA) technology, the Code Division Multiple Access 2000 (CDMA-2000) technology, the Time Division-Synchronous Code Division Multiple Access (TD-SCDMA) technology, the Worldwide Interoperability for Microwave Access (WiMAX) technology, the Long Term Evolution (LTE) technology, the LTE-Advanced (LTE-A) technology, the Time Division LTE (TD-LTE) technology, the fifth-generation (5G) New Radio (NR) technology, and others.

According to the 3rd Generation Partnership Project (3GPP) specifications and/or requirements in compliance with the 5G NR technology, a User Equipment (UE), after selecting a Public Land Mobile Network (PLMN) other than the Registered PLMN (RPLMN) or the Equivalent PLMN (EPLMN) (such scenario is also called a PLMN change), may protect the initial Non-Access Stratum (NAS) message using the NAS security context that has been used in the previous PLMN. However, the UE and the previous PLMN may have used a null ciphering algorithm which effectively does not cipher the initial NAS message. That is, after the PLMN change, the initial NAS message may be sent with its contents in readable plain text format. Alternatively, the UE and the previous PLMN may have used a weak confidentiality algorithm which may leave the initial NAS message vulnerable for decryption by hackers. Either way, the initial NAS message may not be well protected after a PLMN change.

BRIEF SUMMARY OF THE APPLICATION

In order to solve the aforementioned problem, the present application proposes that the UE sends the initial NAS message including only a limited set of Information Elements (IEs) in cleartext after a PLMN change if a predetermined ciphering algorithm (e.g., a null ciphering algorithm or a weak confidentiality algorithm) is adopted for a NAS security context.

In one aspect of the application, a UE comprising a wireless transceiver and a controller is provided. The wireless transceiver is configured to perform wireless transmission and reception. The controller is configured to select a PLMN via the wireless transceiver, determine whether a predetermined ciphering algorithm is adopted for a Non-Access Stratum (NAS) security context, and in response to selecting the PLMN and the predetermined ciphering algorithm being adopted for the NAS security context, send an initial NAS message in which IEs are in cleartext only to the selected PLMN via the wireless transceiver.

In another aspect of the application, a method for protecting an initial NAS message after a PLMN change, executed by a UE, is provided. The method comprises the steps of: selecting a PLMN; determining whether a predetermined ciphering algorithm is adopted for a Non-Access Stratum (NAS) security context; and in response to selecting the PLMN and the predetermined ciphering algorithm being adopted for the NAS security context, sending an initial NAS message in which IEs are in cleartext only to the selected PLMN.

Other aspects and features of the present application will become apparent to those with ordinarily skill in the art upon review of the following descriptions of specific embodiments of the UEs and the methods for protecting an initial NAS message after a PLMN change.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
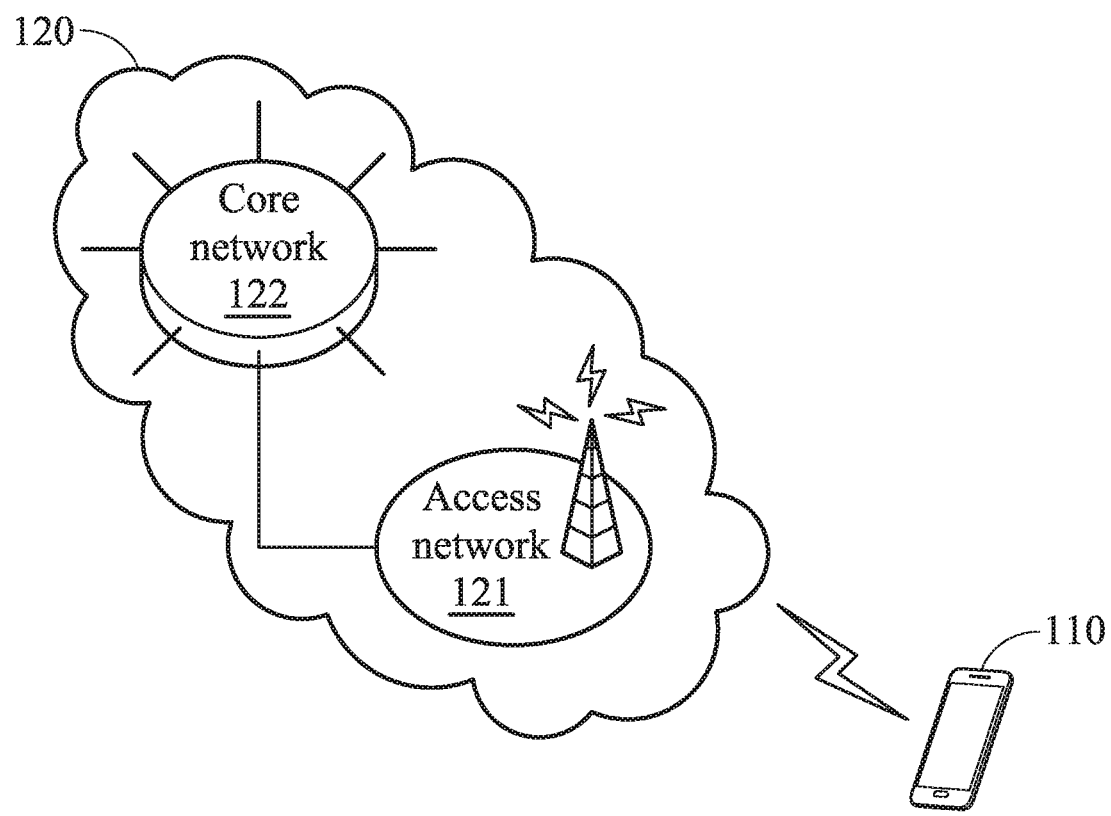
FIG. 1 is a block diagram of a wireless communication environment according to an embodiment of the application.

FIG. 1 is a block diagram of a wireless communication environment according to an embodiment of the application. As shown in FIG. 1, the wireless communication environment 100 may include a User Equipment (UE) 110 and a service network 120, wherein the UE 110 may be wirelessly connected to the service network 120 for obtaining mobile services.

The UE 110 may be a feature phone, a smartphone, a panel Personal Computer (PC), a laptop computer, or any wireless communication device supporting the cellular technology (e.g., the 5G NR technology) utilized by the service network 120. In another embodiment, the UE 110 may support more than one cellular technology. For example, the UE may support the 5G NR technology and a legacy 4G technology, such as the LTE/LTE-A/TD-LTE technology, or the WCDMA technology.

The service network 120 may include an access network 121 and a core network 122. The access network 121 is responsible for processing radio signals, terminating radio protocols, and connecting the UE 110 with the core network 122. The core network 122 is responsible for performing mobility management, network-side authentication, and interfaces with public/external networks (e.g., the Internet). The access network 121 and the core network 122 may each comprise one or more network nodes for carrying out said functions.

In one embodiment, the service network 120 may be a 5G NR network, and the access network 121 may be a Next Generation Radio Access Network (NG-RAN) and the core network 122 may be a Next Generation Core Network (NG-CN).

An NG-RAN may include one or more cellular stations, such as next generation NodeBs (gNBs), which support high frequency bands (e.g., above 24 GHz), and each gNB may further include one or more Transmission Reception Points (TRPs), wherein each gNB or TRP may be referred to as a 5G cellular station. Some gNB functions may be distributed across different TRPs, while others may be centralized, leaving the flexibility and scope of specific deployments to fulfill the requirements for specific cases.

A 5G cellular station may form one or more cells with different Component Carriers (CCs) for providing mobile services to the UE 110. For example, the UE 110 may camp on one or more cells formed by one or more gNBs or TRPs, wherein the cells which the UE 110 is camped on may be referred to as serving cells, including a Primary cell (Pcell) and one or more Secondary cells (Scells).

A NG-CN generally consists of various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session. The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

It should be understood that the wireless communication environment 100 described in the embodiment of FIG. 1 are for illustrative purposes only and are not intended to limit the scope of the application. For example, the wireless communication environment 100 may include both a 5G NR network and a legacy network (e.g., an LTE/LTE-A/TD-LTE network, or a WCDMA network), and the UE 110 may be wirelessly connected to one or both of the 5G NR network and the legacy network.

Figure 2:
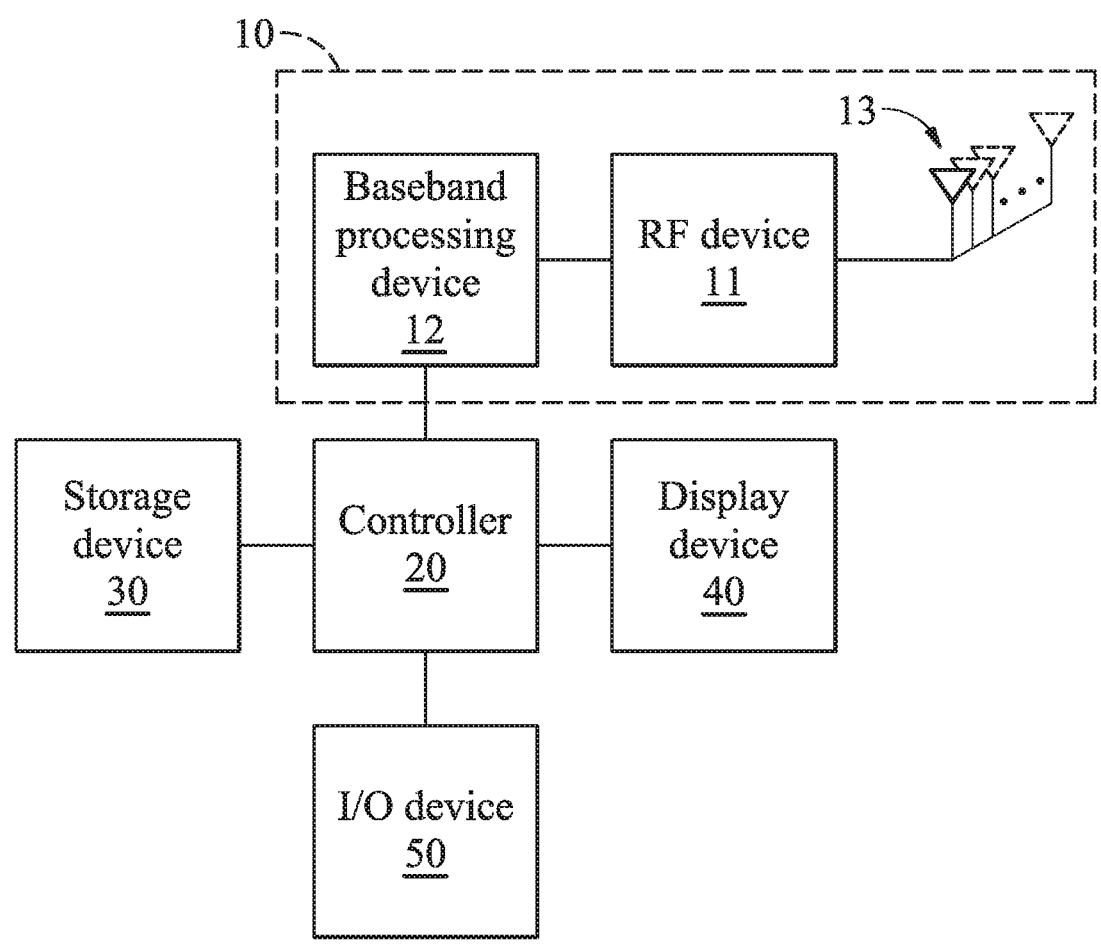
FIG. 2 is a block diagram illustrating the UE 110 according to an embodiment of the application.

FIG. 2 is a block diagram illustrating the UE 110 according to an embodiment of the application.

As shown in FIG. 2, the UE 110 may include a wireless transceiver 10, a controller 20, a storage device 30, a display device 40, and an Input/Output (I/O) device 50.

The wireless transceiver 10 is configured to perform wireless transmission and reception to and from the cells formed by one or more cellular stations of the access network 121.

Specifically, the wireless transceiver 10 may include a Radio Frequency (RF) device 11, a baseband processing device 12, and antenna(s) 13, wherein the antenna(s) 13 may include one or more antennas for beamforming.

The baseband processing device 12 is configured to perform baseband signal processing and control the communications between subscriber identity card(s) (not shown) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 11 may receive RF wireless signals via the antenna(s) 13, convert the received RF wireless signals to baseband signals, which are processed by the baseband processing device 12, or receive baseband signals from the baseband processing device 12 and convert the received baseband signals to RF wireless signals, which are later transmitted via the antenna(s) 13. The RF device 11 may also contain multiple hardware devices to perform radio frequency conversion. For example, the RF device 11 may comprise a mixer to multiply the baseband signals with a carrier oscillated in the radio frequency of the supported cellular technologies, wherein the radio frequency may be any radio frequency (e.g., 30 GHz~300 GHz for mmWave) utilized in the 5G NR technology, or may be 900 MHz, 2100 MHz, or 2.6 GHz utilized in LTE/LTE-A/TD-LTE technology, or another radio frequency, depending on the cellular technology in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communications with the cells formed by cellular station of the access network 121, storing and retrieving data (e.g., program code) to and from the storage device 30, sending a series of frame data (e.g. representing text messages, graphics, images, etc.) to the display device 40, and receiving user inputs or outputting signals via the I/O device 50.

In particular, the controller 20 coordinates the aforementioned operations of the wireless transceiver 10, the storage device 30, the display device 40, and the I/O device 50 for performing the method for protecting an initial NAS message after a PLMN change.

In another embodiment, the controller 20 may be incorporated into the baseband processing device 12, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data, instructions, and/or program code of applications, communication protocols, and/or the method for protecting an initial NAS message after a PLMN change.

The display device 40 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 2 are for illustrative purposes only and are not intended to limit the scope of the application. For example, the UE 110 may include more components, such as a power supply, and/or a Global Positioning System (GPS) device, wherein the power supply may be a mobile/replaceable battery providing power to all the other components of the UE 110, and the GPS device may provide the location information of the UE 110 for use by some location-based services or applications. Alternatively, the UE 110 may include fewer components. For example, the UE 110 may not include the display device 40 and/or the I/O device 50.

Figure 3:
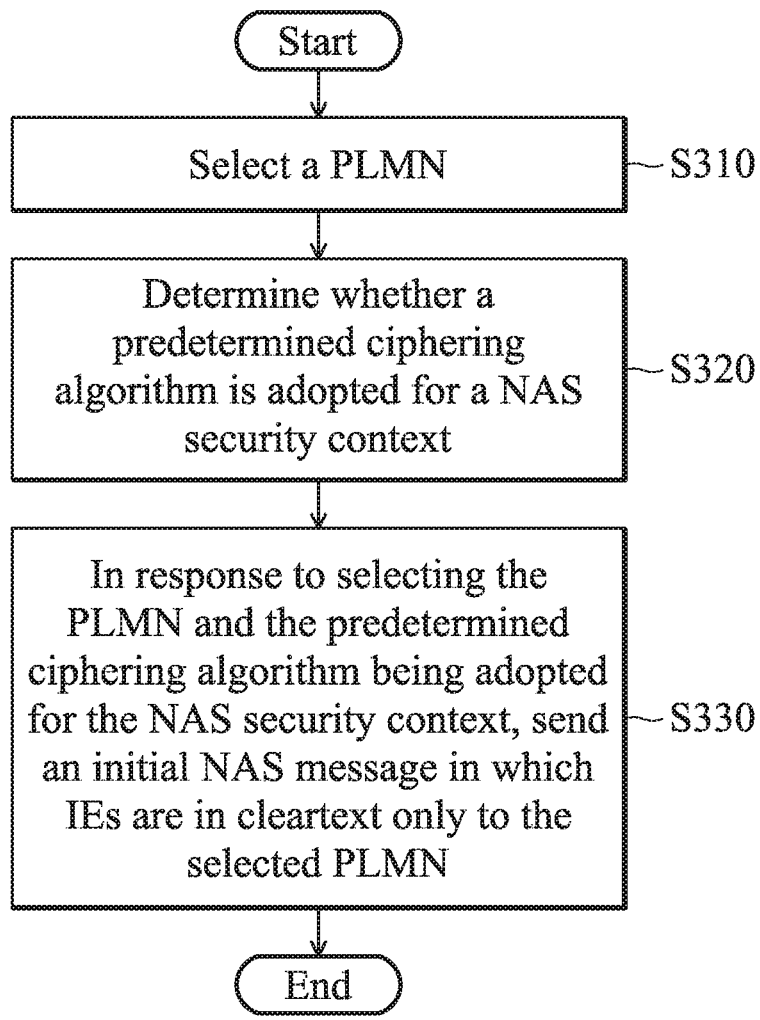
FIG. 3 is a flow chart illustrating the method for protecting an initial NAS message after a PLMN change according to an embodiment of the application.

FIG. 3 is a flow chart illustrating the method for protecting an initial NAS message after a PLMN change according to an embodiment of the application.

In this embodiment, the method for protecting an initial NAS message after a PLMN change is applied to and executed by a UE (e.g., the UE 110). Specifically, the initial NAS message refers to the first NAS message that is sent after the UE transitions from the Radio Resource Control (RRC) idle state to the RRC connected state.

To begin with, the UE selecting a PLMN (step S310).

In one embodiment, the selected PLMN may be a PLMN other than a Registered PLMN (RPLMN) or an Equivalent PLMN (EPLMN). That is, the UE undergoes a PLMN change.

Specifically, the RPLMN is a PLMN on which the UE has performed a location registration successfully, while the EPLMN is a PLMN considered as an equivalent to the RPLMN in terms of service provisioning.

Next, the UE determines whether a predetermined ciphering algorithm is adopted for a NAS security context (step S320).

In one embodiment, the predetermined ciphering algorithm may be a null ciphering algorithm, such as NEA0 or 5G-EA0 which is defined in the 3GPP Technical Specification (TS) 24.501.

In another embodiment, the predetermined ciphering algorithm may be a weak confidentiality algorithm which is breakable or vulnerable, depending on the computing technology in use. For example, the ciphering algorithms, such as 128-NEA1 which is defined in the 3GPP TS 24.501, may be considered strong enough for now. However, with the rapid development of computing technology (e.g., quantum computing), the strong confidentiality algorithms may become breakable or vulnerable in the future.

In other words, the UE has a NAS security context which is used in the previous PLMN, but the ciphering algorithm adopted for the NAS security context may not provide a secure communication with the selected PLMN.

In response to selecting the PLMN and the predetermined ciphering algorithm being adopted for the NAS security context, the UE sends an initial NAS message in which IEs are in cleartext only to the selected PLMN (step S330), and the method ends.

The initial NAS message may be a REGISTRATION REQUEST message, a SERVICE REQUEST message, or a CONTROL PLANE SERVICE REQUEST for a 5G system.

To be more specific, the IEs are a limited set of IEs required to establish security between the UE and the selected PLMN. The limited set of IEs are also called cleartext IEs due to the fact that they can be sent unciphered.

For example, the limited set of IEs may include the subscription identifiers (e.g. SUbscription Concealed Identifier (SUCI) or Globally Unique Temporary UE Identity (GUTI)), UE security capabilities, ngKSI, indication that the UE is moving from Evolved Packet Core (EPC), Additional GUTI, and IE containing the Tracking Area Update (TAU) Request in the case idle mobility from LTE.

In one embodiment, the initial NAS message may only include the IEs that can be sent unciphered. This alternative may enable the selected PLMN to perform the NAS security mode control procedure and to activate another ciphering algorithm which allows the UE to send the non-cleartext IEs with better confidentiality.

In another embodiment, the initial NAS message may further include information (e.g., an additional indication other than the IEs in cleartext) indicating that the UE wishes/requests to send ciphered IEs (also called non-cleartext IEs). This alternative may enable the selected PLMN to choose a ciphering algorithm by performing the NAS security mode control procedure, and the UE may send the non-cleartext IEs in the Security Mode Complete message. If the selected PLMN chooses to use the existing NAS security context for which the predetermined ciphering algorithm is adopted, then the selected PLMN does not need to re-authenticate the UE, thereby reducing signaling overhead.

In another embodiment, the initial NAS message may further include information (e.g., an additional indication other than the IEs in cleartext) indicating that the UE has no NAS security context. This alternative may enable the selected PLMN to perform the NAS security mode control procedure and to create a new NAS security context for which another ciphering algorithm allowing the UE to send the non-cleartext IEs with better confidentiality is adopted.

In another embodiment, the initial NAS message may further include information (e.g., an additional indication other than the IEs in cleartext) indicating that the UE has a NAS security context. This alternative gives the selected PLMN an opportunity to keep using the existing NAS security context but the selected PLMN has to confirm the use of the predetermined ciphering algorithm by performing the NAS security mode control procedure in order to receive the rest IEs (i.e., the non-cleartext IEs) from the UE via the Security Mode Complete message.

In another embodiment, the initial NAS message may further include an empty NAS message container IE. When the NAS message container IE is empty (i.e., its length equals zero), it indicates to the selected PLMN that the UE has non-cleartext IEs to send but it did not send them due to the predetermined ciphering algorithm not being confirmed by the selected PLMN.

Alternatively, if the new PLMN in a PLMN change is a PLMN equivalent to the previous PLMN, then the UE may consider that the PLMN has not been changed and may behave like it has been using the same PLMN all the time.

Figure 4:
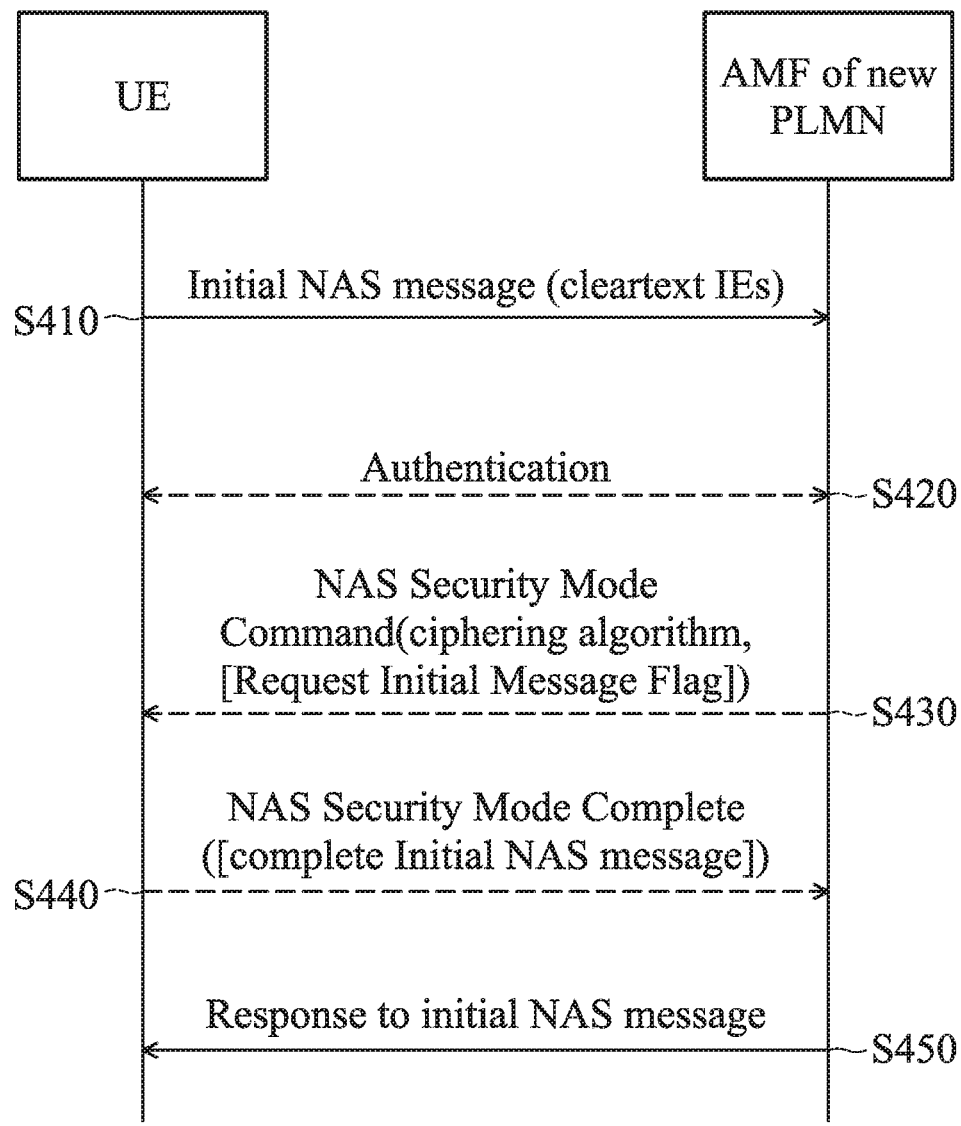
FIG. 4 is a message sequence chart illustrating protection of an initial NAS message after a PLMN change according to an embodiment of the application.

FIG. 4 is a message sequence chart illustrating protection of an initial NAS message after a PLMN change according to an embodiment of the application.

To begin with, the UE (e.g., the UE 110) sends an initial NAS message including only the cleartext IEs to the AMF of the new PLMN in a PLMN change, when a predetermined ciphering algorithm (e.g., 5G-EA0 or NEA0) is adopted for a NAS security context (step S410). That is, the UE acts like it has no NAS security context.

Next, if the AMF of the new PLMN is not able to find the NAS security context locally or from the last visited AMF (the AMF that is last visited by the UE), or if the AMF of the new PLMN is able to find the NAS security context locally or from the last visited AMF but it decides not to use the NAS security context, or if the integrity check of the received initial NAS message fails, then the AMF may initiate an authentication procedure with the UE (step S420). Otherwise, if the AMF of the new PLMN is able to find the NAS security context locally or from the last visited AMF and it decides to use the NAS security context, then step S420 may be omitted.

After a successful authentication with the UE, the AMF of the new PLMN may send a NAS Security Mode Command message containing a ciphering algorithm to the UE (step S430). The ciphering algorithm may be the same as the predetermined ciphering algorithm, or may be different from the predetermined ciphering algorithm.

For example, the ciphering algorithm contained in the NAS Security Mode Command message may be 128-5G-EA1, 128-5G-EA2, 128-5G-EA3, 5G-EA4, 5G-EA5, 5G-EA6, or 5G-EA7 defined in the 3GPP TS 24.501, while the predetermined ciphering algorithm may be NEA0 or 5G-EA0 defined in the 3GPP TS 24.501.

In one embodiment, the NAS Security Mode Command message may include a flag requesting the UE to send the complete initial NAS message including the non-cleartext IEs in the NAS Security Mode Complete message.

Subsequently, the UE may send a NAS Security Mode Complete message to the AMF in response to receiving the NAS Security Mode Command message with a flag requesting the complete initial NAS message (step S440).

The NAS Security Mode Complete message is ciphered using the ciphering algorithm indicated in the NAS Security Mode Command message. Furthermore, the NAS Security Mode Complete message may include the complete initial NAS message which includes the cleartext IEs and the non-cleartext IEs.

Please note that steps S420 to S440 may be optional (i.e., steps S420 to S440 are present only in certain situations as described above).

The AMF may use the initial NAS message received in step S410 or S440 as the message to respond to. The AMF may send its response to the initial NAS message (step S450). This response message may be ciphered and integrity protected.

In view of the forgoing embodiments, it should be appreciated that the present application realizes secure delivery of non-cleartext IEs in an initial NAS message after a PLMN change, by allowing the UE to behave like it has no NAS security context when a null ciphering algorithm or a weak confidentiality algorithm is adopted for the existing NAS security context. That is, the UE may include only the cleartext IEs in the initial NAS message after a PLMN change, so as to prevent the non-cleartext IEs from being sent using a null ciphering algorithm or a weak confidentiality algorithm.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

What is claimed is:

1. A User Equipment (UE), comprising:
   a wireless transceiver, configured to perform wireless transmission and reception; and
   a controller, configured to select a Public Land Mobile Network (PLMN) via the wireless transceiver, determine whether the UE has a Non-Access Stratum (NAS) security context for which a null ciphering algorithm or a weak confidentiality algorithm is adopted, and in response to selecting the PLMN and the UE having the NAS security context for which the null ciphering algorithm or the weak confidentiality algorithm is adopted, send an initial NAS message in which Information Elements (IEs) are in cleartext only to the selected PLMN via the wireless transceiver.

2. The UE of claim 1, wherein the selected PLMN is other than a Registered PLMN (RPLMN) or an Equivalent PLMN (EPLMN).

3. The UE of claim 1, wherein the null ciphering algorithm is NEA0 or 5G-EA0 defined in the 3rd Generation Partnership Project (3GPP) Technical Specification (TS) 24.501.

4. The UE of claim 1, wherein the controller is further configured to discard the NAS security context, in response to selecting the PLMN and the UE having the NAS security context for which the predetermined ciphering algorithm is adopted.

5. The UE of claim 1, wherein the controller is further configured to keep the NAS security context but not use the NAS security context in the selected PLMN, in response to selecting the PLMN and the UE having the NAS security context for which the predetermined ciphering algorithm is adopted.

6. The UE of claim 1, wherein the IEs are a limited set of IEs required to establish security between the UE and the selected PLMN.

7. The UE of claim 1, wherein the initial NAS message only comprises the IEs that can be sent unciphered.

8. The UE of claim 1, wherein the initial NAS message further comprises one of the following:
 information indicating that the UE requests to send ciphered IEs;
 information indicating that the UE has no NAS security context or that the UE has a NAS security context; and
 an empty NAS message container IE.

9. The UE of claim 1, wherein the initial NAS message is a REGISTRATION REQUEST message, a SERVICE REQUEST message, or a CONTROL PLANE SERVICE REQUEST message for a 5G system.

10. A method for protecting an initial Non-Access Stratum (NAS) message after a Public Land Mobile Network (PLMN) change, executed by a UE, the method comprising:
 selecting a PLMN;
 determining whether the UE has a Non-Access Stratum (NAS) security context for which a null ciphering algorithm or a weak confidentiality algorithm is adopted; and
 in response to selecting the PLMN and the UE having the NAS security context for which the null ciphering algorithm or the weak confidentiality algorithm is adopted, sending an initial NAS message in which Information Elements (IEs) are in cleartext only to the selected PLMN.

11. The method of claim 10, wherein the selected PLMN is other than a Registered PLMN (RPLMN) or an Equivalent PLMN (EPLMN).

12. The method of claim 10, wherein the null ciphering algorithm is NEA0 or 5G-EA0 defined in the 3rd Generation Partnership Project (3GPP) Technical Specification (TS) 24.501.

13. The method of claim 10, further comprising:
 discarding the NAS security context, in response to selecting the PLMN and the UE having the NAS security context for which the predetermined ciphering algorithm is adopted.

14. The method of claim 10, further comprising:
 keeping the NAS security context but not using the NAS security context in the selected PLMN, in response to selecting the PLMN and the UE having the NAS security context for which the predetermined ciphering algorithm is adopted.

15. The method of claim 10, wherein the IEs are a limited set of IEs required to establish security between the UE and the selected PLMN.

16. The method of claim 10, wherein the initial NAS message only comprises the IEs that can be sent unciphered.

17. The method of claim 10, wherein the initial NAS message further comprises one of the following:
 information indicating that the UE requests to send ciphered IEs;
 information indicating that the UE has no NAS security context or that the UE has a NAS security context; and
 an empty NAS message container IE.

18. The method of claim 10, wherein the initial NAS message is a REGISTRATION REQUEST message, a SERVICE REQUEST message, or a CONTROL PLANE SERVICE REQUEST message for a 5G system.

* * * * *